(12) United States Patent
Ide

(10) Patent No.: US 10,634,498 B2
(45) Date of Patent: Apr. 28, 2020

(54) PHYSICAL QUANTITY SENSOR, ELECTRONIC APPARATUS, AND MOVING OBJECT

(71) Applicant: Seiko Epson Corporation, Tokyo (JP)

(72) Inventor: Tsugio Ide, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 255 days.

(21) Appl. No.: 15/280,351

(22) Filed: Sep. 29, 2016

(65) Prior Publication Data

US 2017/0115116 A1 Apr. 27, 2017

(30) Foreign Application Priority Data

Oct. 21, 2015 (JP) ................................ 2015-207520

(51) Int. Cl.
*G01C 19/5635* (2012.01)
*G01C 19/5783* (2012.01)
*G01C 19/5628* (2012.01)
*G01C 19/5642* (2012.01)

(52) U.S. Cl.
CPC ..... *G01C 19/5635* (2013.01); *G01C 19/5628* (2013.01); *G01C 19/5642* (2013.01); *G01C 19/5783* (2013.01)

(58) Field of Classification Search
CPC ................................ G01C 19/5635
USPC ...................................... 73/504.12
See application file for complete search history.

(56) References Cited

U.S. PATENT DOCUMENTS

| 8,631,701 | B2* | 1/2014 | Chiba | G01C 19/5783 73/504.12 |
| 2004/0200279 | A1* | 10/2004 | Mitani | G01C 19/5663 73/504.03 |
| 2005/0217377 | A1 | 10/2005 | Ao | |
| 2006/0255441 | A1* | 11/2006 | Ohta | G01C 19/56 257/680 |
| 2009/0013784 | A1* | 1/2009 | Ohkoshi | G01C 19/56 73/504.16 |
| 2009/0183568 | A1 | 7/2009 | Yamanaka et al. | |
| 2011/0036167 | A1 | 2/2011 | Ohkoshi et al. | |
| 2013/0026583 | A1* | 1/2013 | Matsukawa | G01C 19/5628 257/415 |
| 2013/0178008 | A1* | 7/2013 | Sugiura | B81C 1/00301 438/50 |
| 2013/0241013 | A1 | 9/2013 | Yamanaka et al. | |
| 2013/0312517 | A1 | 11/2013 | Jeong et al. | |
| 2015/0040666 | A1 | 2/2015 | Saito et al. | |
| 2015/0247877 | A1 | 9/2015 | Kanemoto | |

(Continued)

FOREIGN PATENT DOCUMENTS

| CN | 104882469 A | 9/2015 |
| JP | 2005-283424 A | 10/2005 |

(Continued)

*Primary Examiner* — Nimeshkumar D Patel
*Assistant Examiner* — Jean F Morello
(74) *Attorney, Agent, or Firm* — Oliff PLC

(57) ABSTRACT

A physical quantity sensor includes: a base; an IC disposed on the base; an angular rate sensor and an acceleration sensor disposed on the IC; a first stress buffer layer disposed between the IC and the angular rate sensor; and a second stress buffer layer disposed between the IC and the acceleration sensor. The first and second stress buffer layers are disposed spaced apart from each other.

20 Claims, 15 Drawing Sheets

(56) References Cited

U.S. PATENT DOCUMENTS

2016/0116284 A1\* 4/2016 Shimura ............ G01C 19/5628
                                                              73/504.12
2016/0131678 A1   5/2016 Yaguchi et al.
2016/0298964 A1  10/2016 Ide
2017/0074653 A1\* 3/2017 Kanazawa ......... G01C 19/5621

FOREIGN PATENT DOCUMENTS

| JP | 2008-076264 A | 4/2008 |
| JP | 2009-080107 A | 4/2009 |
| JP | 2009-168777 A | 7/2009 |
| JP | 2012-168097 A | 9/2012 |
| JP | 2014-013207 A | 1/2014 |
| JP | 2015-010906 A | 1/2015 |
| JP | 2015-034755 A | 2/2015 |
| JP | 2016-200526 A | 12/2016 |
| WO | 2012/049825 A1 | 4/2012 |

\* cited by examiner

PHYSICAL QUANTITY SENSOR, ELECTRONIC APPARATUS, AND MOVING OBJECT

BACKGROUND

1. Technical Field

The present invention relates to a physical quantity sensor, an electronic apparatus, and a moving object.

2. Related Art

In the related art, a combined sensor that can detect acceleration and angular rate, such as that disclosed in JP-A-2014-13207, is known as a physical quantity sensor. A physical quantity sensor disclosed in JP-A-2014-13207 includes a substrate, an angular rate detecting element and an acceleration detecting element that are supported by the substrate, a connecting portion that connects the angular rate detecting element with the substrate, and a connecting portion that connects the acceleration detecting element with the substrate.

In such a configuration, however, a drive vibration of the angular rate detecting element is easily transmitted to the acceleration detecting element through the substrate, leading to a problem in that a detection signal of the acceleration detecting element is susceptible to noise generation.

SUMMARY

An advantage of some aspects of the invention is to provide a physical quantity sensor capable of providing excellent physical quantity detection sensitivity, an electronic apparatus, and a moving object.

The invention can be implemented as the following forms or application examples.

A physical quantity sensor according to an application example includes: a base; a circuit element disposed on the base; a first physical quantity sensor element disposed over at least one of the base and the circuit element and driven to vibrate; a second physical quantity sensor element disposed over at least one of the base and the circuit element; and a stress buffer layer interposed between at least one of the first physical quantity sensor element and the second physical quantity sensor element and at least one of the base and the circuit element.

With this configuration, the vibration of the first physical quantity sensor element can be relaxed (attenuated) by the stress buffer layer, and the vibration is less likely to be transmitted to the second physical quantity sensor element. Therefore, the physical quantity sensor capable of providing excellent physical quantity detection sensitivity is provided.

In the application example described above, it is preferable that the first physical quantity sensor element is disposed on the stress buffer layer, and the stress buffer is disposed on the circuit element.

With this configuration, since the first physical quantity sensor element and the circuit element are disposed to overlap each other, the planar size of the physical quantity sensor can be reduced, and the physical quantity sensor can be miniaturized.

In the application example described above, it is preferable that the second physical quantity sensor element is not disposed over the stress buffer layer.

In the application example described above, it is preferable that the stress buffer layer includes a first stress buffer layer component and a second stress buffer layer component disposed spaced apart from each other, both the first stress buffer layer component and second stress buffer layer component are disposed on the circuit element, the first physical quantity sensor element is disposed on the first stress buffer layer component over the circuit element, and that the second physical quantity sensor element is disposed on the second stress buffer layer component over the circuit element.

With this configuration, the vibration of the first physical quantity sensor element is still less likely to be transmitted to the second physical quantity sensor element.

In the application example described above, it is preferable that the stress buffer layer is disposed on the circuit element, the first physical quantity sensor element is disposed on the stress buffer layer over the circuit element, and that the second physical quantity sensor element is disposed over the base.

With this configuration, the propagation path of vibration can be lengthened, and the vibration of the first physical quantity sensor element is still less likely to be transmitted to the second physical quantity sensor element.

In the application example described above, it is preferable that the stress buffer layer includes a first stress buffer layer component and a second stress buffer layer component disposed spaced apart from each other, first stress buffer layer component being disposed on the circuit element and the second stress buffer layer component being disposed on the base, that the first physical quantity sensor element is disposed the first stress buffer layer component over the circuit element, and that the second physical quantity sensor element is disposed on the second stress buffer layer over the base.

With this configuration, the vibration of the first physical quantity sensor element is still less likely to be transmitted to the second physical quantity sensor element.

In the application example described above, it is preferable that the circuit element is disposed on a first surface of the base, and that the second physical quantity sensor element is disposed on a second surface of the base on a side opposite to a side defined by the first surface.

With this configuration, the propagation path of vibration can be lengthened, and the vibration of the first physical quantity sensor element is still less likely to be transmitted to the second physical quantity sensor element. Moreover, the widening of the physical quantity sensor in its in-plane direction can be suppressed, and the physical quantity sensor can be miniaturized.

In the application example described above, it is preferable that the circuit element includes a drive circuit that drives the first physical quantity sensor element, a first detection circuit that performs a detection process based on a detection signal from the first physical quantity sensor element, and a second detection circuit that performs a detection process based on a detection signal from the second physical quantity sensor element.

With this configuration, two physical quantities can be detected by the circuit element.

In the application example described above, it is preferable that the first physical quantity sensor element is an angular rate sensor that detects angular rate, and that the second physical quantity sensor element is an acceleration sensor that detects acceleration.

With this configuration, the physical quantity sensor with high convenience is provided.

An electronic apparatus according to another application example includes the physical quantity sensor described above.

With this configuration, the electronic apparatus with high reliability is obtained.

A moving object according to still another application example includes the physical quantity sensor described above.

With this configuration, the moving object with high reliability is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, an electronic apparatus, and a moving object according to the invention will be described in detail based on embodiments shown in the accompanying drawings.

Figure 1:
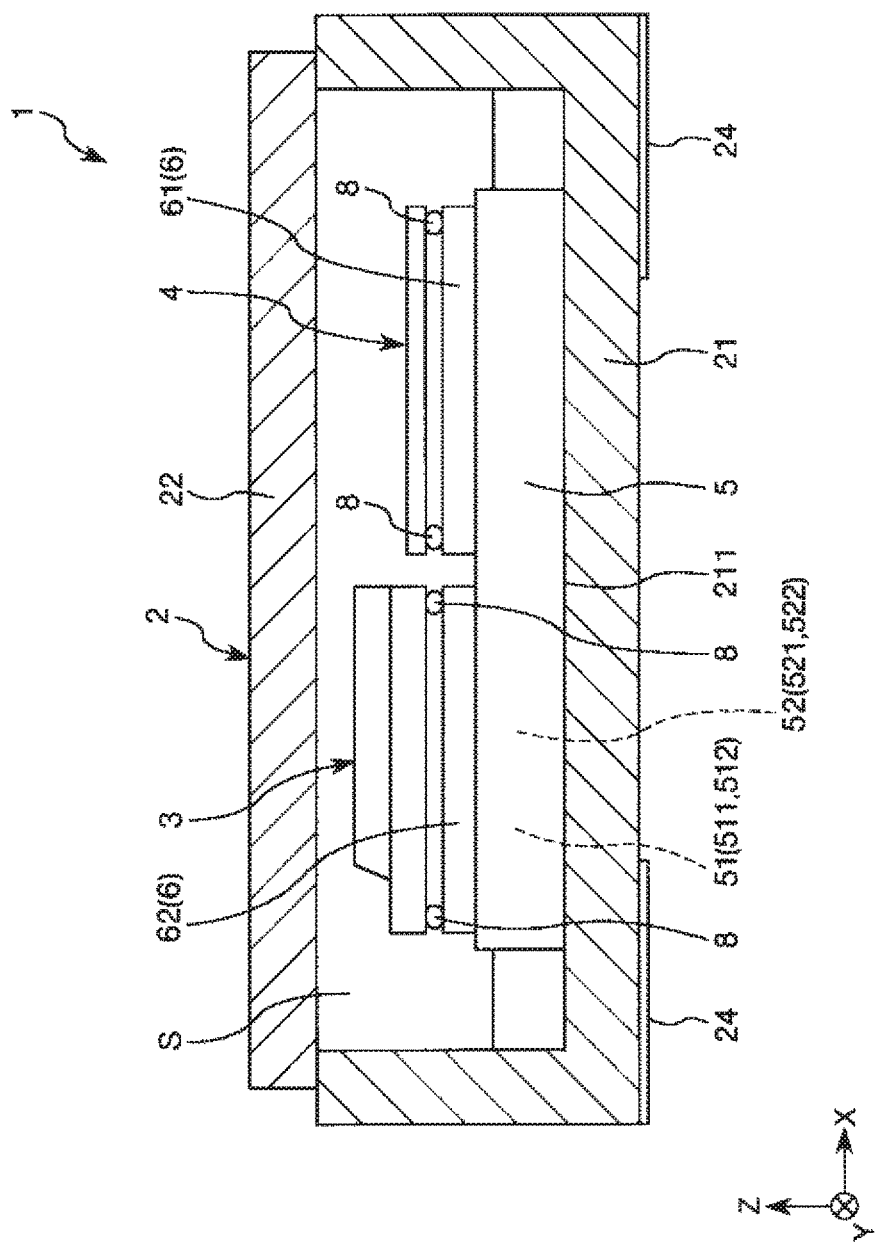
FIG. 1 is a cross-sectional view showing a physical quantity sensor according to a first embodiment of the invention.
Figure 2:
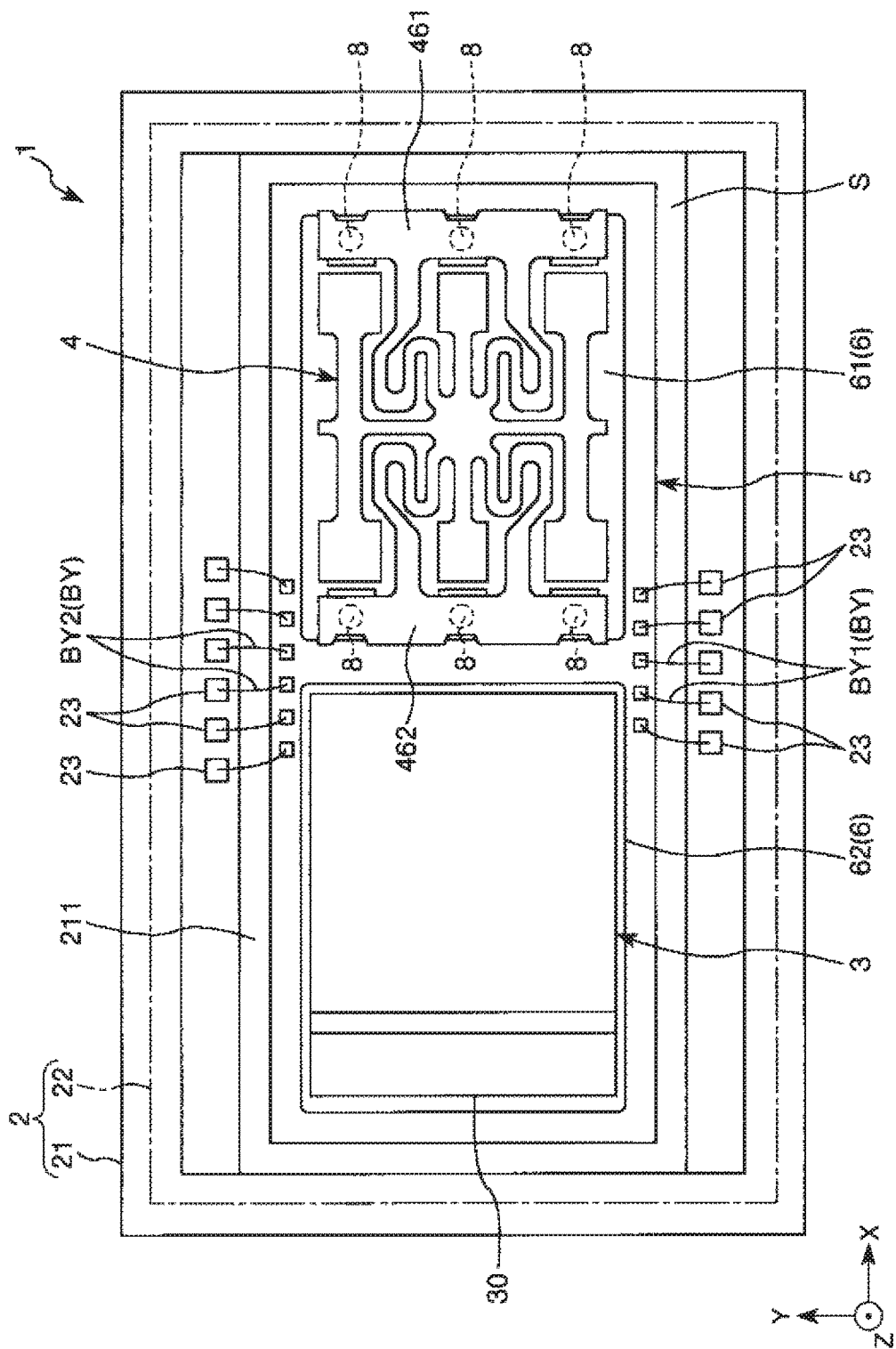
FIG. 2 is a plan view of the physical quantity sensor shown in FIG. 1.
Figure 3:
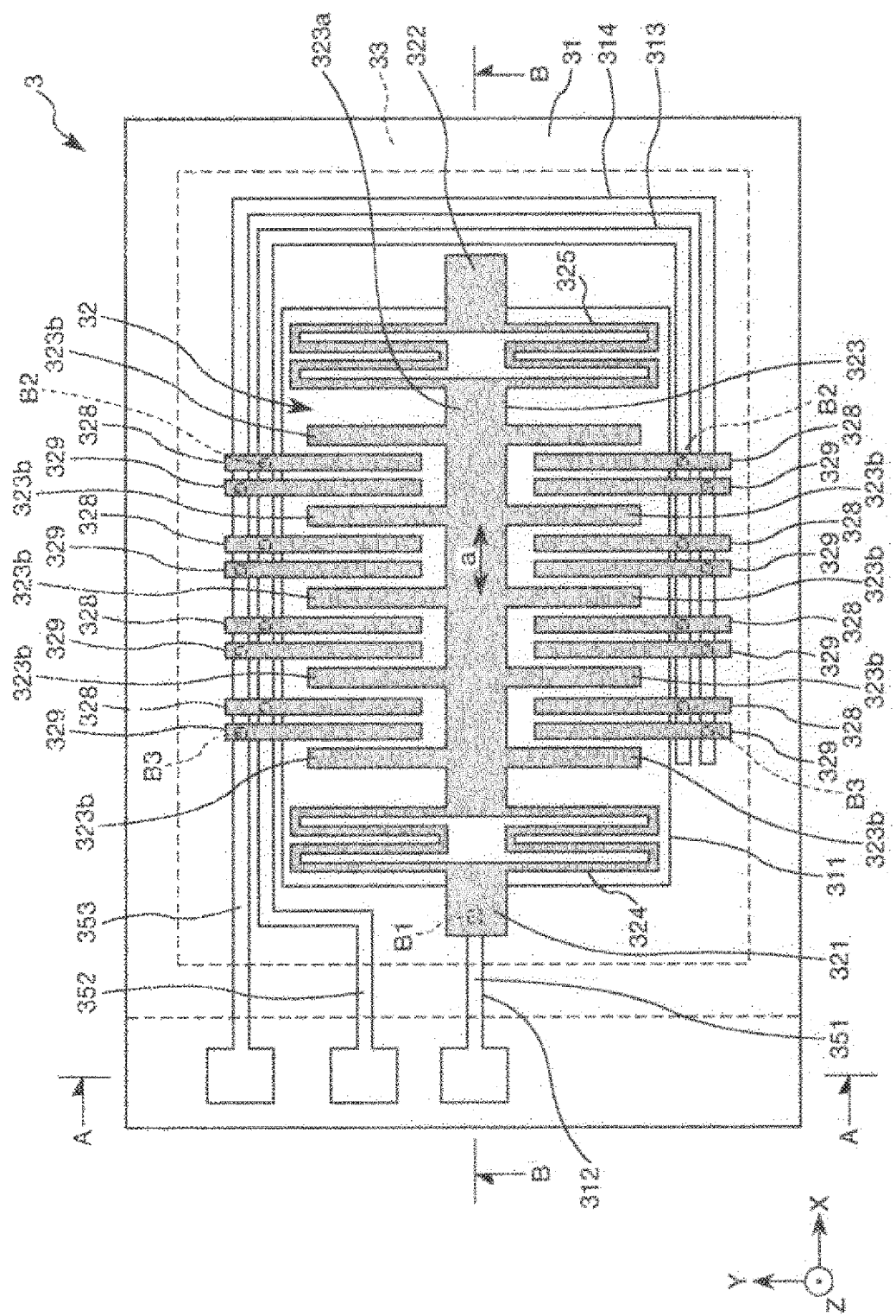
FIG. 3 is a plan view showing an acceleration sensor element (e.g. accelerometer).
Figure 4:
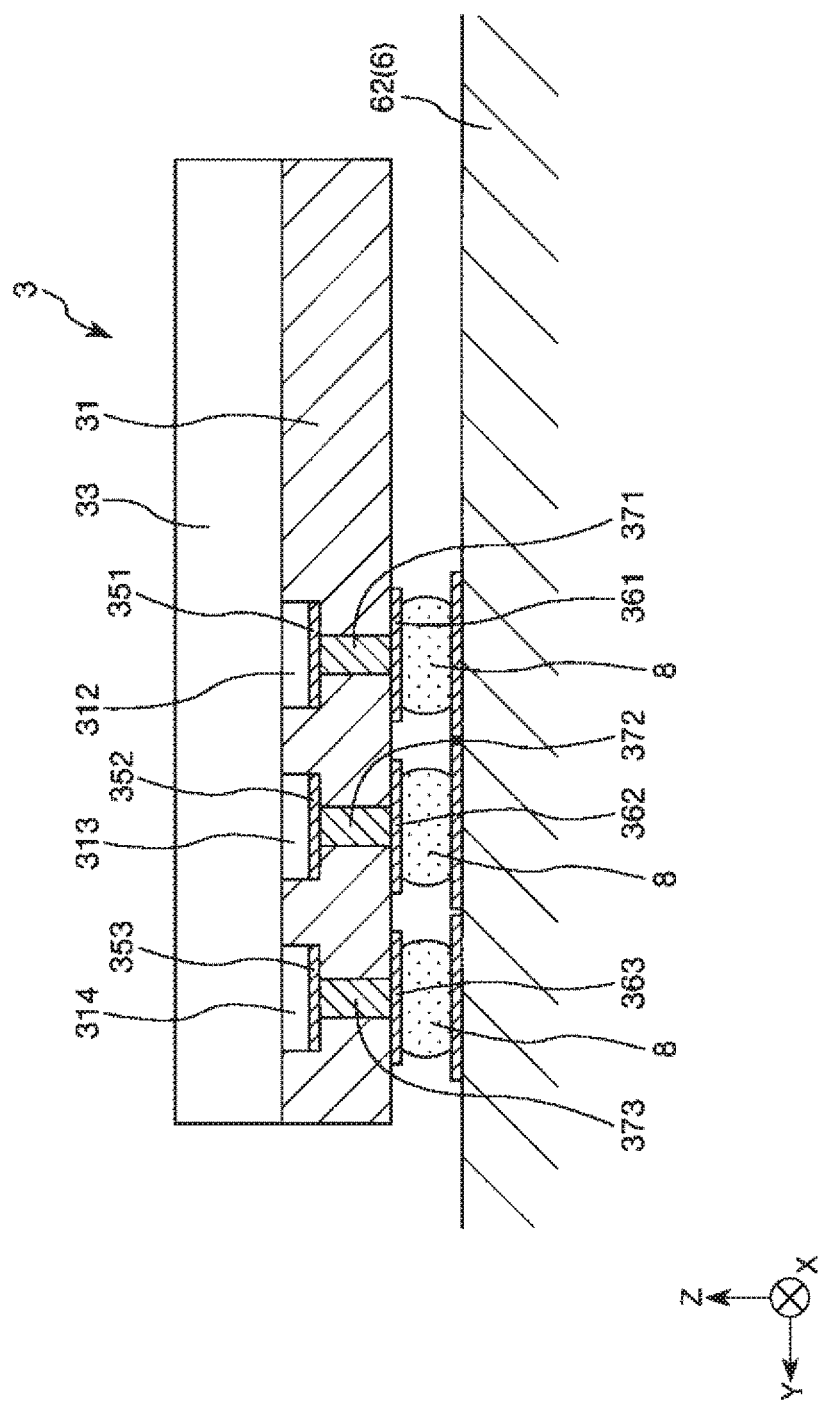
FIG. 4 is a cross-sectional view taken along the line A-A in FIG. 3.
Figure 5:
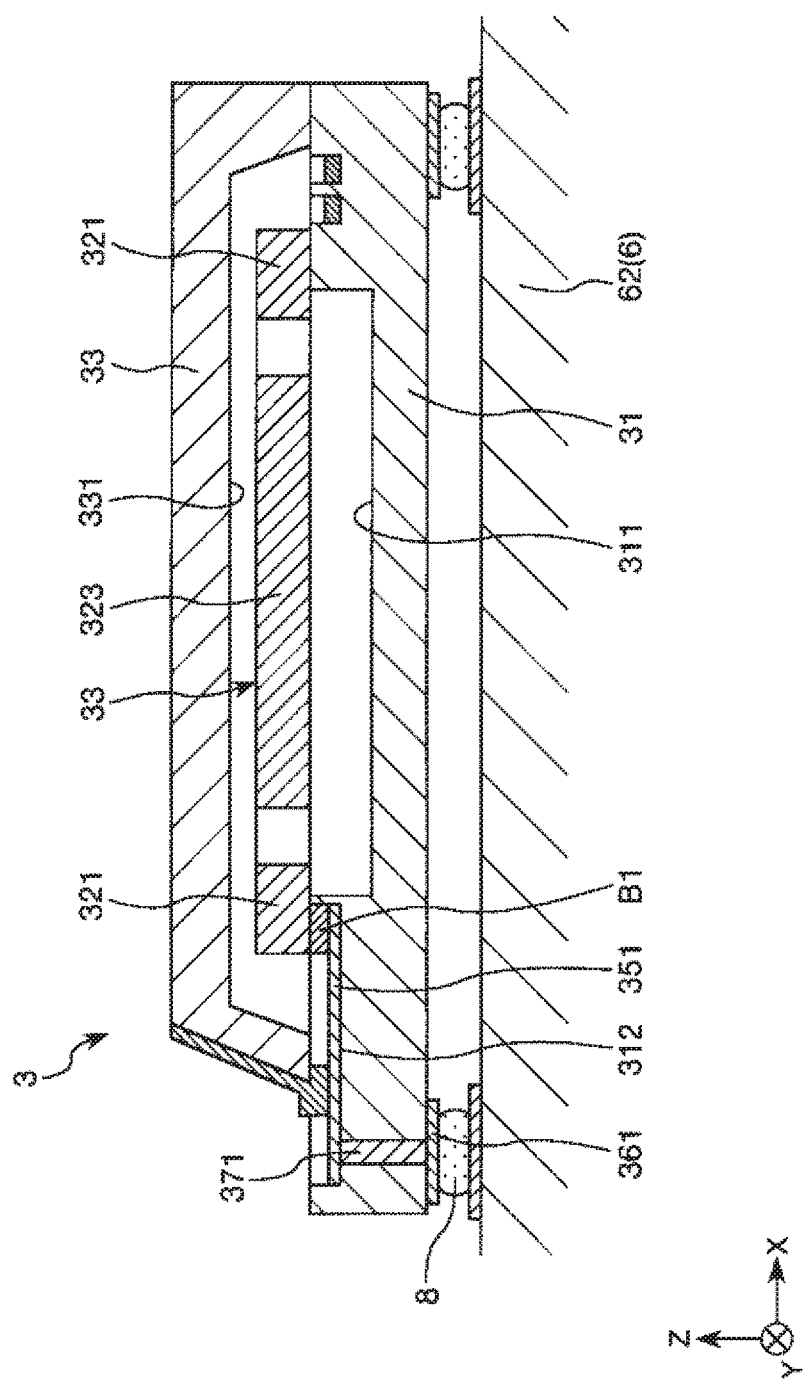
FIG. 5 is a cross-sectional view taken along the line B-B in FIG. 3.
Figure 6:
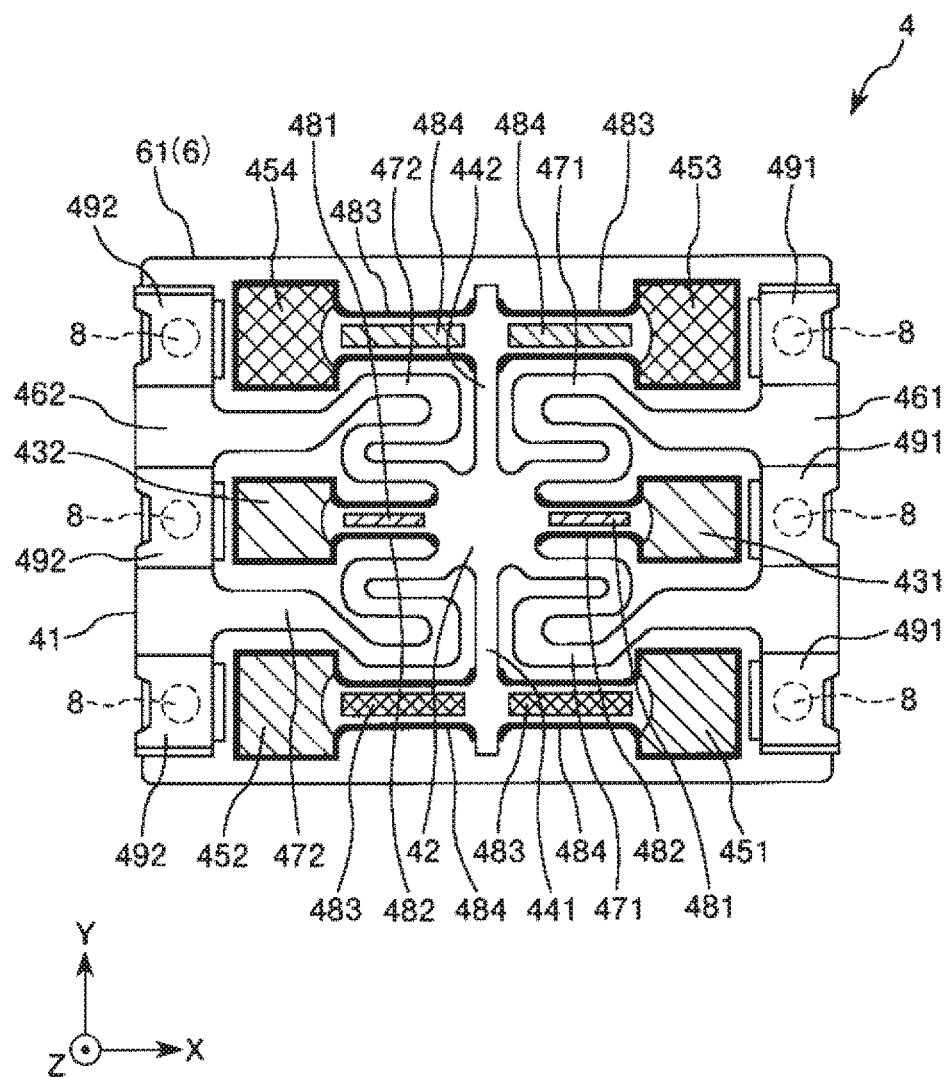
FIG. 6 is a plan view showing an angular rate sensor element (e.g. gyroscope or gyro sensor or angular velocity sensor).
Figure 7:
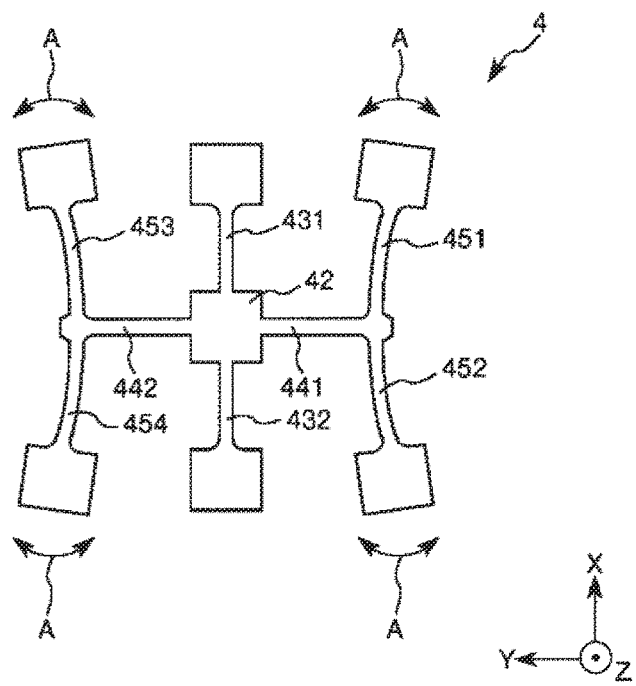
FIG. 7 is a plan view for explaining the operation of the angular rate sensor element shown in FIG. 6.
Figure 8:
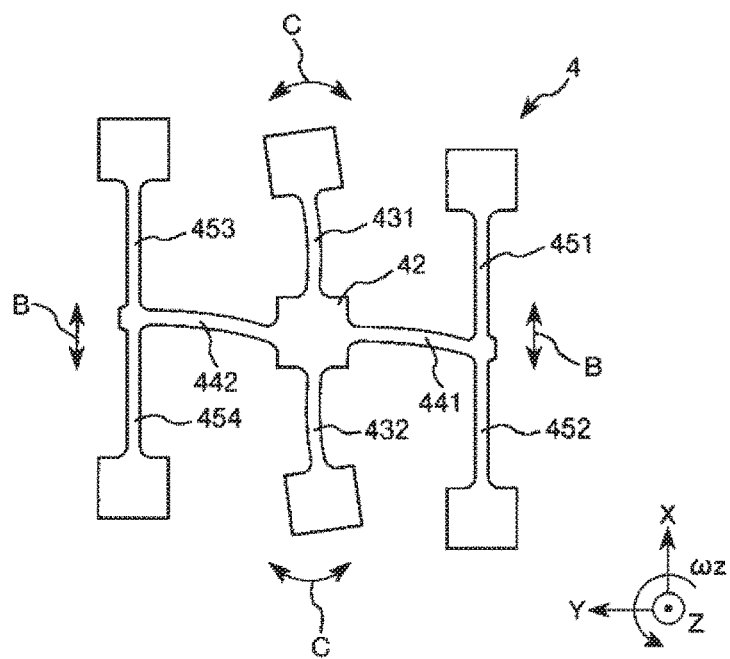
FIG. 8 is a plan view for explaining the operation of the angular rate sensor element shown in FIG. 6.
Figure 9:
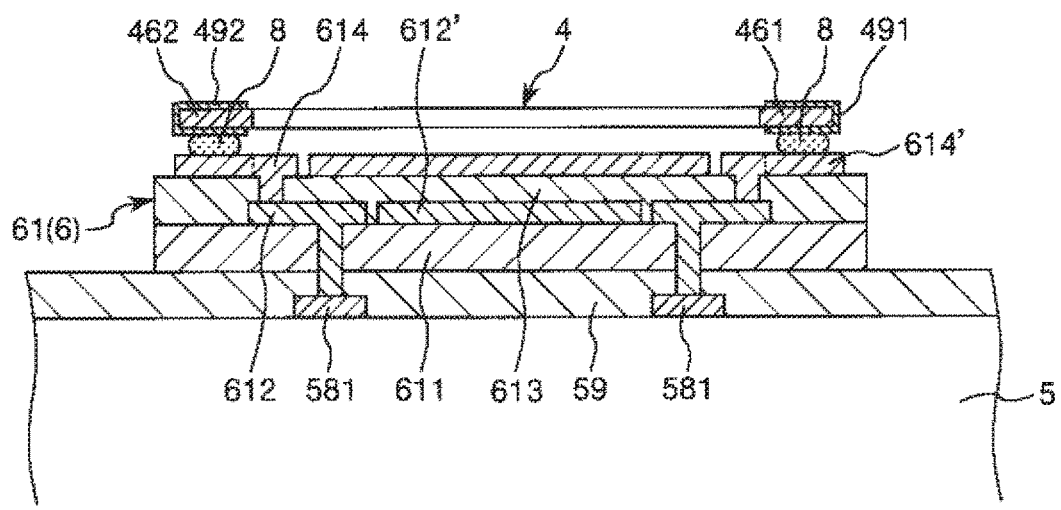
FIG. 9 is a cross-sectional view showing a first stress buffer layer.
Figure 10:
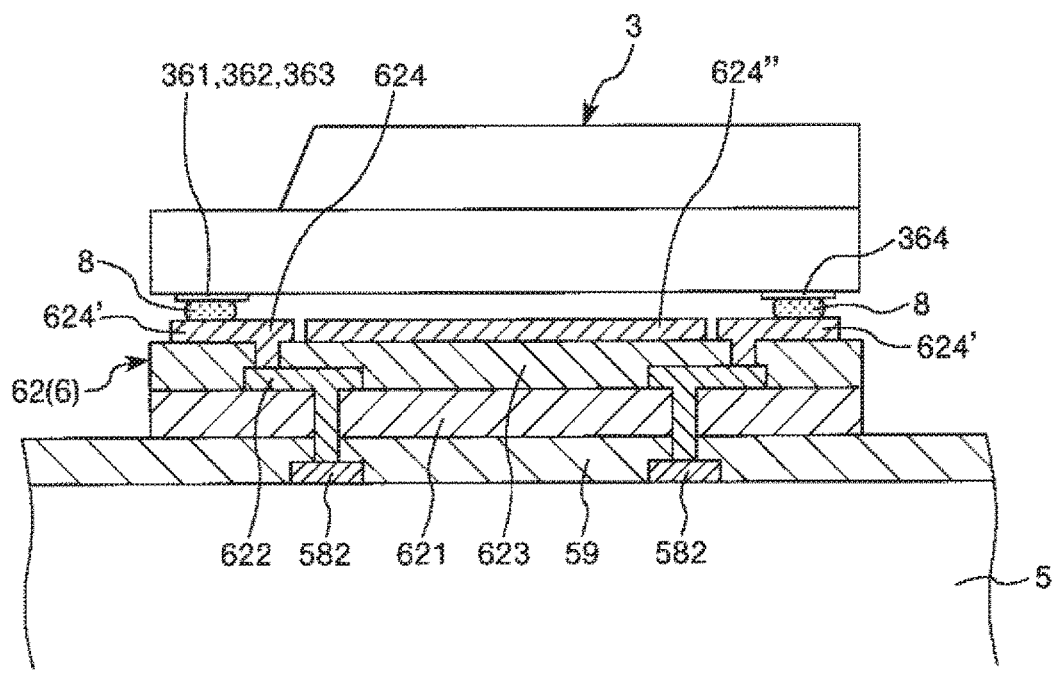
FIG. 10 is a cross-sectional view showing a second stress buffer layer.

FIG. 1 is a cross-sectional view showing a physical quantity sensor according to a first embodiment of the invention. FIG. 2 is a plan view of the physical quantity sensor shown in FIG. 1. FIG. 3 is a plan view showing an acceleration sensor element (accelerometer). FIG. 4 is a cross-sectional view taken along the line A-A in FIG. 3. FIG. 5 is a cross-sectional view taken along the line B-B in FIG. 3. FIG. 6 is a plan view showing an angular rate sensor element (e.g. gyroscope, such as microelectromechanical system (mems) gyroscope). FIGS. 7 and 8 are plan views for explaining the operation of the angular rate sensor element shown in FIG. 6. FIG. 9 is a cross-sectional view showing a first stress buffer layer (component). FIG. 10 is a cross-sectional view showing a second stress buffer layer (component). In the following, for convenience of description, the upper side of FIG. 1 (such as corresponding to the top of lid 22 of package 2) is referred to as "top" or "upper", and the lower side of FIG. 1 (such as corresponding to the bottom of cavity-like base 21 of package 2) is referred to as "bottom" or "lower". Moreover, three axes orthogonal to one another are defined as an X-axis, a Y-axis, and a Z-axis. A direction parallel to the X-axis is referred to as "X-axis direction"; a direction parallel to the Y-axis is referred to as "Y-axis direction"; and a direction parallel to the Z-axis is referred to as "Z-axis direction".

The physical quantity sensor 1 shown in FIG. 1 includes a package 2, an acceleration sensor element (second physical quantity sensor element) 3, an angular rate sensor element (first physical quantity sensor element) 4, an IC (integrated circuit, or circuit element) 5, and a stress buffer layer 6. These components will be successively described in detail below.

Package

As shown in FIG. 1, the package 2 includes a cavity-like base 21 including a recess 211 that is opened toward the upper surface, and a plate-like lid 22 that closes the opening of the recess 211 and is bonded to the base 21. The package 2 includes an interior space S formed by closing the opening of the recess 211 with the lid 22. The acceleration sensor element 3, the angular rate sensor element 4, and the IC 5 are accommodated in the interior space S. The interior space S is hermetically sealed, and a reduced-pressure state (approximately 10 PA or less, and preferably a vacuum) is established therein. With this configuration, the angular rate sensor element 4 can be efficiently driven.

The constituent material of the base 21 is not particularly limited, but examples thereof can include, for example, various kinds of ceramics (such as aluminum oxide), a glass material, and a metal material. The constituent material of the lid 22 is not particularly limited, but a member having a linear expansion coefficient close to (substantially similar to) that of the constituent material of the base 21 is preferred. For example, when the ceramic described above (aluminum oxide) is used as the constituent material of the base 21, an alloy such as Kovar is preferably used. The method of bonding the base 21 and the lid 22 together is not particularly limited, and the lid 22 may be bonded to the base 21 through, for example, a metallization layer or an adhesive material.

As shown in FIG. 2, the base 21 is provided with a plurality of internal terminals 23 facing the interior space S. The internal terminals 23 are electrically connected, through internal wirings (not shown) formed in the base 21, to external terminals 24 (see FIG. 1) disposed on the bottom surface of the base 21. The number of the internal terminals 23 or the external terminals 24 is not particularly limited, and may be appropriately set as necessary.

Acceleration Sensor Element

The acceleration sensor element 3 is fixed to (disposed on) the upper surface of the IC 5 through a stress buffer layer 6 (a second stress buffer layer 62). Moreover, the acceleration sensor element 3 is disposed biased toward the (−X)-axis side of the IC 5. The acceleration sensor element 3 is not particularly limited as long as it can detect acceleration in at least one direction; however, the following configuration, for example, can be employed.

As shown in FIG. 3, the acceleration sensor element 3 includes a base substrate 31, an element piece 32 (e.g. silicon substrate doped with an impurity such as phosphorus or boron) supported by the base substrate 31, and a lid 33 covering the element piece 32 and bonded to the base substrate 31.

The base substrate 31 is preferably formed of glass, has a plate shape, and is provided with a recess 311 in the upper surface thereof. Moreover, recesses 312, 313, and 314 are provided in the upper surface of the base substrate 31. In the recesses 312, 313, and 314, wirings 351, 352, and 353 are disposed. As shown in FIG. 4, terminals 361, 362, and 363 are disposed on the lower surface of the base substrate 31. The wirings 351, 352, and 353 and the terminals 361, 362, and 363 are electrically connected through vias 371, 372, and 373 penetrating the base substrate 31.

Returning to FIG. 3, the element piece 32 includes support portions 321 and 322, a movable portion 323, coupling portions 324 and 325, first fixed electrode fingers 328, and second fixed electrode fingers 329. The movable portion 323 includes a base portion 323a and a plurality of movable electrode fingers 323b projecting from the base portion 323a on the both sides thereof in the Y-axis direction. The element piece 32 is formed of, for example, a silicon substrate doped with an impurity such as phosphorus or boron.

The support portions 321 and 322 are bonded to the upper surface of the base substrate 31, and are electrically connected at the support portion 321 to the wiring 351 through a conductive bump B1 (see also FIG. 5). The movable portion 323 is provided between the support portions 321 and 322. The movable portion 323 is coupled to the support portions 321 and 322 through the coupling portions 324 and 325. Therefore, with the elastic deformation of the coupling portions 324 and 325, the movable portion 323 can be displaced in the X-axis direction, as indicated by the arrow a, relative to the support portions 321 and 322.

The first fixed electrode finger 328 is disposed on one side of the movable electrode finger 323b corresponding thereto in the X-axis direction. The plurality of first fixed electrode fingers 328 are arranged in parallel in an interdigital pattern in which the first fixed electrode finger 328 is engaged with the movable electrode finger 323b corresponding thereto with a gap therebetween. The plurality of first fixed electrode fingers 328 are electrically connected with the wiring 352 through a conductive bump B2.

In contrast, the second fixed electrode finger 329 is disposed on the other side of the movable electrode finger 323b corresponding thereto in the X-axis direction. The plurality of second fixed electrode fingers 329 are arranged in parallel in an interdigital pattern in which the second fixed electrode finger 329 is engaged with the movable electrode finger 323b corresponding thereto with a gap therebetween. The plurality of second fixed electrode fingers 329 are electrically connected to the wiring 353 through a conductive bump B3.

As shown in FIG. 5, the lid 33 has a plate shape and is provided with a recess 331 in the lower surface thereof. The lower surface of the lid 33 is bonded to the upper surface of the base substrate 31.

The acceleration sensor element 3 having the configuration described above detects acceleration as described below. When acceleration in the X-axis direction is applied, the movable portion 323 is displaced in the X-axis direction based on the magnitude of the acceleration while causing the coupling portions 324 and 325 to elastically deform. With this displacement, the gap between the movable electrode finger 323b and the first fixed electrode finger 328 and the gap between the movable electrode finger 323b and the second fixed electrode finger 329 vary, and an electrostatic capacitance between the movable electrode finger 323b and the first fixed electrode finger 328 and an electrostatic capacitance between the movable electrode finger 323b and the second fixed electrode finger 329 are changed. The changes in electrostatic capacitance are output, in response to the application of a carrier wave for detecting the electrostatic capacitance from the IC 5 to the first fixed electrode fingers 328 and the second fixed electrode fingers 329, as a detection signal through the terminal 361 coupled to the movable portion 323. Then, the IC 5 detects the acceleration based on the obtained detection signal.

Angular Rate Sensor Element

The angular rate sensor element 4 is fixed to (disposed on) the upper surface of the IC 5 through the stress buffer layer 6. Moreover, the angular rate sensor element 4 is disposed biased to the (+X)-axis side of the IC 5, and is arranged side by side with the acceleration sensor element 3 in the X-axis direction. The angular rate sensor element 4 is not particularly limited as long as it can detect angular rate about a predetermined axis; however, the following configuration, for example, can be employed.

As shown in FIG. 6, the angular rate sensor element 4 includes a vibrator element 41 obtained by patterning a quartz crystal substrate, and electrodes provided on the vibrator element 41. However, the material of the vibrator element 41 is not limited to quartz crystal, and examples thereof can include, for example, a piezoelectric material such as lithium tantalate or lithium niobate.

The vibrator element 41 includes a base portion 42, detection arms 431 and 432 extending in the X-axis direction from opposite sides of the base portion 42, coupling arms 441 and 442 extending in the Y-axis direction from opposite sides of the base portion 42, drive arms 451 and 452 extending in the X-axis direction from opposite sides of the coupling arm 441, and drive arms 453 and 454 extending in the X-axis direction from opposite sides of the coupling arm 442. Moreover, the vibrator element 41 includes a pair of support portions 461 and 462 disposed so as to interpose the base portion 42 therebetween, a beam portion 471 coupling the base portion 42 with the support portion 461, and a beam portion 472 coupling the base portion 42 with the support portion 462. The vibrator element 41 is fixed at the support portions 461 and 462 to the stress buffer layer 6.

The electrodes include detection signal electrodes 481, detection ground electrodes 482, drive signal electrodes 483, and drive ground electrodes 484. The detection signal electrodes 481 are disposed on the upper and lower surfaces of the detection arms 431 and 432. The detection ground electrodes 482 are disposed on the both side surfaces of the detection arms 431 and 432. The drive signal electrodes 483 are disposed on the upper and lower surfaces of the drive arms 451 and 452 and the both side surfaces of the drive arms 453 and 454. The drive ground electrodes 484 are disposed on the upper and lower surfaces of the drive arms 453 and 454 and the both side surfaces of the drive arms 451 and 452.

A plurality of terminals 491 are disposed in the support portion 461. At least one terminal 491 is electrically connected to the detection signal electrode 481, and at least one terminal 491 is electrically connected to the detection ground electrode 482. However, a plurality of terminals 492 are preferably disposed in the support portion 462. At least one terminal 492 is electrically connected to the drive signal electrode 483, and at least one terminal 492 is electrically connected to the drive ground electrode 484. That is, the terminals 491 provided in the support portion 461 are terminals for extracting signals for detection, while the terminals 492 provided in the support portion 462 are terminals for extracting signals for driving.

The angular rate sensor element 4 having the configuration described above detects angular rate as described below. In the state where no angular rate is applied to the angular rate sensor element 4, when a drive signal is applied between the drive signal electrode 483 and the drive ground electrode 484, the drive arms 451 to 454 vibrate in a flexing manner in the direction indicated by the arrow A as shown in FIG. 7. At this time, since the drive arms 451 to 454 symmetrically vibrate, the detection arms 431 and 432 almost do not vibrate. Then, when angular rate ωz about the Z-axis is applied in this state, the Coriolis force acts on the drive arms 451 to 454 to excite a vibration in the direction indicated by the arrow B as shown in FIG. 8. In response to this vibration, the detection arms 431 and 432 vibrate in a flexing manner in the direction indicated by the arrow C. Electric charges generated in the detection arms 431 and 432 due to the vibration are extracted as a detection signal from between the detection signal electrode 481 and the detection ground electrode 482, and based on the signal, the IC 5 detects the angular rate ωz.

IC

As shown in FIGS. 1 and 2, the IC 5 is fixed to the bottom surface of the recess 211 of the base 21, preferably by means of, for example, a fixing member such as silver paste or an adhesive material. The IC 5 is electrically connected to the acceleration sensor element 3 through the stress buffer layer 6, and at the same time is electrically connected to the angular rate sensor element 4 through the stress buffer layer 6. Moreover, the IC 5 is electrically connected to the internal terminals 23 through bonding wires BY.

The IC 5 includes a first circuit 51 connected to the angular rate sensor element 4, and a second circuit 52 connected to the acceleration sensor element 3. The first circuit 51 includes a drive circuit 511 that drives (applies the drive signal to the angular rate sensor element 4) the angular rate sensor element 4, and a detection circuit (first detection circuit) 512 that performs a process for detecting angular rate based on the detection signal from the angular rate sensor element 4. On the other hand, the second circuit 52 includes a drive circuit 521 that applies the carrier wave to the acceleration sensor element 3, and a detection circuit (second detection circuit) 522 that performs a process for detecting acceleration based on the detection signal from the acceleration sensor element 3. With this configuration, the acceleration and angular rate applied to the physical quantity sensor 1 can be detected by the IC 5. In addition to these components, the IC 5 includes, as necessary, for example an A/D conversion circuit that converts an analog signal to a digital signal, and an interface that performs communications with an external device. The communication system of the IC 5 is not particularly limited, and examples thereof can include, for example, a serial peripheral interface (SPI (registered trademark)) and an inter-integrated circuit ($I^2C$ (registered trademark)). The IC 5 may have a selecting function for selecting the communication system so that the communication system can be selected between SPI and $I^2C$.

Here, as shown in FIG. 2, the plurality of bonding wires BY include bonding wires BY1 through which digital signals (power supply for the interface, output signals obtained by converting the detected angular rate or acceleration into digital signals) propagate, and bonding wires BY2 through which analog signals propagate. Therefore, in the embodiment, the bonding wires BY1 and the bonding wires BY2 are disposed spaced as far apart as possible from each other. Specifically, the bonding wires BY1 are disposed toward the (−Y)-axis side with respect to the center of the IC 5, while the bonding wires BY2 are disposed toward the (+Y)-axis side with respect to the center of the IC 5. That is, the bonding wires BY1 and BY2 are disposed on opposite sides of IC 5 with the center of the IC 5 therebetween. With the arrangement described above, the digital signal is less likely to be introduced into the analog signal, and thus noise can be reduced.

Moreover, the bonding wires BY1 are collectively disposed at the central portion of the IC 5 in the X-axis direction. The acceleration sensor element 3 is disposed with a side (outer edge) 30, along which the terminals 361, 362, and 363 are aligned, directed to the −X-axis side so that the terminals 361, 362, and 363 are located as far distally as possible from the bonding wires BY1. With this configuration, the digital signal propagating through the bonding wire BY1 is less likely to be introduced into the detection signal (analog signal) of the acceleration sensor element 3, and thus noise can be reduced. Accordingly, a reduction in detection sensitivity for acceleration can be reduced. Similarly, the angular rate sensor element 4 is disposed with the support portion 461, in which the terminals 491 for detection signals are disposed, directed to the +X-axis side (distal side with respect to the center of the IC 5) and with the support portion 462, in which the terminals 492 for drive signals are disposed, directed to the (−X)-axis side (proximal side with respect to the center of the IC 5) so that the terminals 491 are located as far distally as possible from the bonding wires BY1.

Stress Buffer Layer

As shown in FIGS. 1 and 2, the stress buffer layer 6 is provided on the upper surface of the IC 5. The stress buffer layer 6 includes a first stress buffer layer (component) 61 provided between the IC 5 and the angular rate sensor element 4, and includes a second stress buffer layer (component) 62 provided between the IC 5 and the acceleration sensor element 3. The first and second stress buffer layers (components) 61 and 62 are disposed spaced apart from each other. The first stress buffer layer 61 is disposed on the upper surface of the IC 5, and connected to the angular rate sensor element 4 through conductive fixing members 8. Similarly, the second stress buffer layer 62 is disposed on the upper surface of the IC 5, and connected to the acceleration sensor element 3 through conductive fixing members 8. The fixing member 8 is not particularly limited as long as it has conductivity, and examples thereof can include, for example, a metal brazing material, a metal bump such as a gold bump or a silver bump, and a conductive adhesive. The fixing member 8 may be composed of a core made of resin and a conductive film covering the core. According to the configuration, the fixing member can be made relatively soft.

By providing the first and second stress buffer layers 61 and 62, vibration (flexural vibration of the drive arms 451 to 454) caused by the driving of the angular rate sensor element 4 is less likely to be transmitted to the acceleration sensor element 3. Therefore, displacement of the movable portion 323 of the acceleration sensor element 3 due to the vibration (force other than acceleration) caused by the driving of the angular rate sensor element 4 can be reduced, and thus noise due to the vibration is less likely to be introduced into the detection signal of the acceleration sensor element 3. Hence, the physical quantity sensor 1 having excellent acceleration detection sensitivity is provided. In particular, since the first stress buffer layer 61 and the second stress buffer layer 62 are spaced apart from each other in the embodiment, the vibration of the angular rate sensor element 4 can be prevented from transmitting to the acceleration sensor element 3 through the stress buffer layer 6, and the advantageous effect described above becomes more remarkable.

Moreover, by providing the stress buffer layer 6, an impact received by the package 2 is cushioned, and the impact is less likely to be transmitted to the angular rate sensor element 4 or the acceleration sensor element 3. Therefore, the mechanical strength of the physical quantity sensor 1 is improved. Moreover, a stress produced due to the difference in thermal expansion between the IC 5, and the angular rate sensor element 4 and the acceleration sensor element 3 is relaxed, making the angular rate sensor element 4 or the acceleration sensor element 3 less deformable. Therefore, angular rate and acceleration can be detected more accurately.

As shown in FIG. 9, the first stress buffer layer 61 includes an insulating layer 611 stacked on the upper surface (on a passivation film 59) of the IC 5, a wiring layer 612 formed on the insulating layer 611 and electrically connected with terminals 581 of the IC 5, an insulating layer 613 formed on the wiring layer 612 and the insulating layer 611, and a wiring layer 614 formed on the insulating layer 613 and electrically connected with the wiring layer 612.

The angular rate sensor element 4 is fixed through the fixing members 8 to terminals 614' formed of the wiring layer 614. With this configuration, the IC 5 and the angular rate sensor element 4 are electrically connected through the fixing members 8 and the wiring layers 612 and 614. The wiring layers 612 and 614 function as wirings (rearrangement wirings) for electrically connecting the IC 5 with the angular rate sensor element 4. Therefore, the terminals 581 of the IC 5 for connecting to the angular rate sensor element 4 can be freely disposed without considering the configuration (particularly the positions of the terminals 491 and 492) of the angular rate sensor element 4.

A ground wiring 612' connected to the ground (fixed potential) is disposed in the wiring layer 612 so as to widely spread. With this configuration, the ground wiring 612' functions as a shield layer, so that, for example, the digital signal in the IC 5 is less likely to be introduced into the detection signal (analog signal) from the angular rate sensor element 4, and thus that noise can be reduced. The ground wiring 612' is formed of a relatively hard (and stiff) material such as a metal material; therefore, as the ground wiring 612' is spaced as far apart as possible from the angular rate sensor element 4, the vibration generated from the angular rate sensor element 4 is more easily attenuated by the first stress buffer layer 61. In the embodiment, therefore, the ground wiring 612' is formed of the wiring layer 612, which is located closer to the IC 5 side (distal from the angular rate sensor element 4) than the wiring layer 614, in the first stress buffer layer 61. The ground wiring 612' may be disposed between, for example, the passivation film 59 and the insulating layer 611.

As shown in FIG. 10, the second stress buffer layer 62 includes an insulating layer 621 stacked on the upper surface (on the passivation film 59) of the IC 5, a wiring layer 622 formed on the insulating layer 621 and electrically connected with the IC 5, an insulating layer 623 formed on the wiring layer 622 and the insulating layer 621, and a wiring layer 624 formed on the insulating layer 623 and electrically connected with the wiring layer 622.

The acceleration sensor element 3 is fixed through the fixing members 8 to terminals 624' formed of the wiring layer 624. With this configuration, the IC 5 and the acceleration sensor element 3 are electrically connected through the fixing member 8 and the wiring layers 622 and 624. The wiring layers 622 and 624 function as wirings for electrically connecting the IC 5 to the acceleration sensor element 3. Therefore, terminals 582 of the IC 5 for connecting to the acceleration sensor element 3 can be freely disposed without considering the configuration (particularly the positions of the terminals 361 to 363) of the acceleration sensor element 3. In the embodiment, dummy terminals 364 (terminals simply for the purpose of fixation) are provided on the lower surface of the acceleration sensor element 3, and the dummy terminals 364 are also fixed to the terminals 624' through the fixing members 8. With this configuration, the acceleration sensor element 3 can be stably fixed to the second stress buffer layer 62.

A ground wiring 624" connected to the ground is disposed in the wiring layer 624 so as to widely spread. With this configuration, the ground wiring 624" functions as a shield layer, so that, for example, the digital signal in the IC 5 is less likely to be introduced into the detection signal (analog signal) from the acceleration sensor element 3, and thus that noise can be reduced. The ground wiring 624" is formed of a relatively hard material such as a metal material; therefore, as the ground wiring 624" is spaced as far apart as possible from the angular rate sensor element 4, the vibration generated from the angular rate sensor element 4 is more easily attenuated by the second stress buffer layer 62. In the embodiment, therefore, the ground wiring 624" is formed of the wiring layer 624, which is located closer to the acceleration sensor element 3 side (distal from the angular rate sensor element 4) than the wiring layer 622, 624 in the second stress buffer layer 62.

The insulating layers 611, 613, 621, and 623 are configured of a resin material having elasticity. Therefore, the vibration caused by the driving of the angular rate sensor element 4 can be effectively attenuated by the insulating layers 611, 613, 621, and 623. The resin material is not particularly limited, but examples thereof can include, for example, polyimide, silicone-modified polyimide resin, epoxy resin, silicone-modified epoxy resin, acrylic resin, phenol resin, silicone resin, modified polyimide resin, benzocyclobutene, and polybenzoxazole. The wiring layers 612, 614, 622, and 624 are not particularly limited, but examples thereof can include, for example, a metal film of Al, Cu, W, Ti, TiN, or the like.

The physical quantity sensor 1 of the embodiment has been described. As described above, the stress buffer layer 6 includes the first and second stress buffer layers 61 and 62 in the embodiment; however, the stress buffer layer 6 may include at least one of the first and second stress buffer layers 61 and 62. That is, any one of the first and second stress buffer layers 61 and 62 may be omitted. Moreover, the first and second stress buffer layers 61 and 62 are disposed spaced apart from each other in the embodiment; however, the first and second stress buffer layers 61 and 62 may be connected. In this case, to make the vibration less likely to be transmitted from the first stress buffer layer 61 to the second stress buffer layer 62, a vibration non-transmitting portion such as a notch or a through-hole is preferably formed between the first stress buffer layer 61 and the second stress buffer layer 62.

Second Embodiment

Next, a physical quantity sensor according to a second embodiment of the invention will be described.

Figure 11:
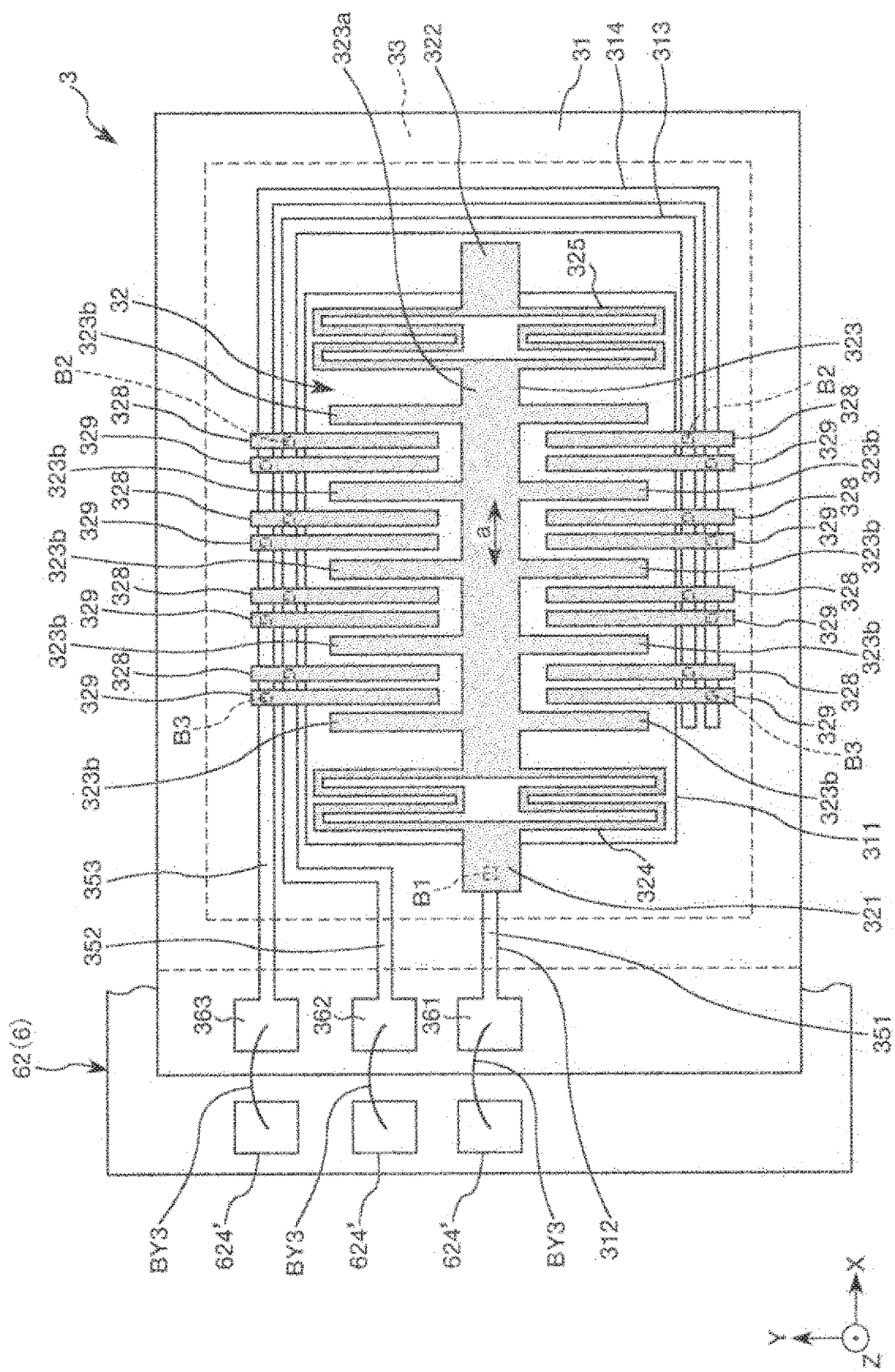
FIG. 11 is a plan view of an acceleration sensor element included in a physical quantity sensor according to a second embodiment of the invention.

FIG. 11 is a plan view of an acceleration sensor element included in the physical quantity sensor according to the second embodiment of the invention.

The physical quantity sensor according to the embodiment is similar to the physical quantity sensor according to the first embodiment described above, except that the configuration of the acceleration sensor element and the method for providing electrical continuity between the acceleration sensor element and the stress buffer layer are different.

In the following description, the physical quantity sensor of the second embodiment is described focusing on the differences from that of the embodiment(s) described above, and the description of similar matters is omitted. In FIG. 11, configurations similar to those of the embodiment described above are denoted by the same reference characters (numerals and signs), and are described above.

In the acceleration sensor element 3 of the embodiment as shown in FIG. 11, the terminals 361, 362, and 363 are provided in the recesses 312, 313, and 314. The acceleration sensor element 3 is fixed to the second stress buffer layer 62 through an adhesive or the like, and is electrically connected to the second stress buffer layer 62 (the terminals 624') through bonding wires BY3.

Also according to the second embodiment, an advantageous effect similar to that of the first embodiment described above can be provided.

Third Embodiment

Next, a physical quantity sensor according to a third embodiment of the invention will be described.

Figure 12:
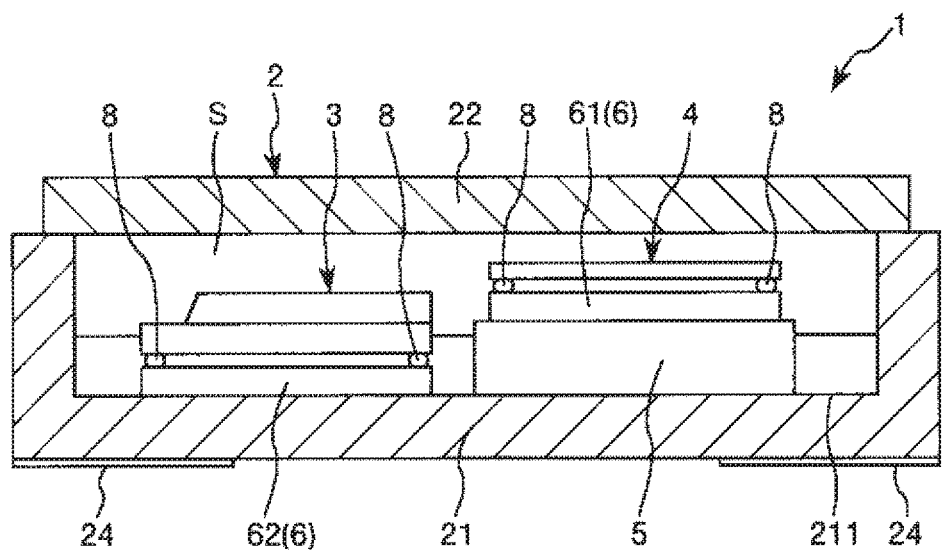
FIG. 12 is a cross-sectional view showing a physical quantity sensor according to a third embodiment of the invention.
Figure 13:
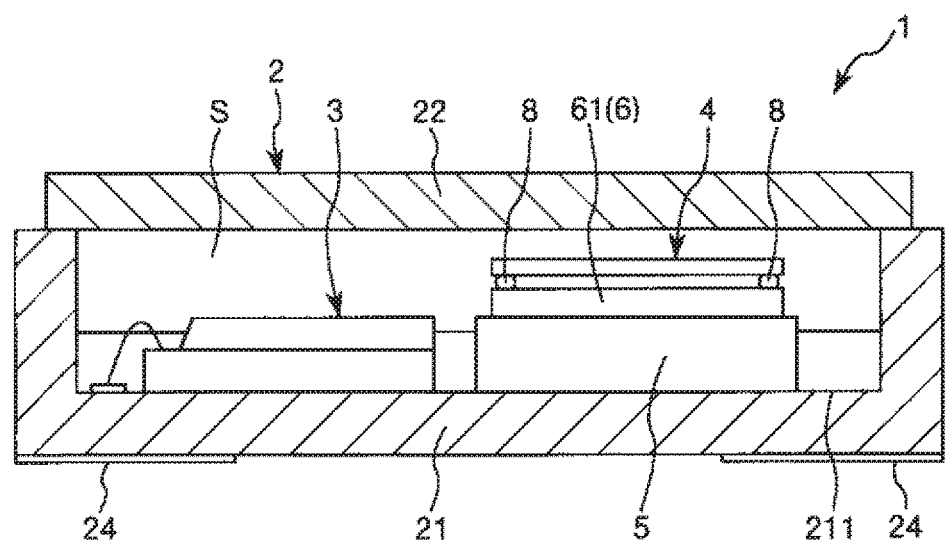
FIG. 13 is a cross-sectional view showing a modified example of the physical quantity sensor shown in FIG. 12.

FIG. 12 is a cross-sectional view showing the physical quantity sensor according to the third embodiment of the invention. FIG. 13 is a cross-sectional view showing a modified example of the physical quantity sensor shown in FIG. 12.

The physical quantity sensor according to the embodiment is similar to the physical quantity sensor according to the first embodiment described above, except that the arrangement of the acceleration sensor element is different.

In the following description, the physical quantity sensor of the third embodiment is described focusing on the difference from that of the embodiment (s) described above, and the description of similar matters is omitted. In FIGS. 12 and 13, configurations similar to those of the embodiment described above are denoted by the same reference characters (numerals and signs), and are described above.

In the physical quantity sensor 1 of the embodiment as shown in FIG. 12, the acceleration sensor element 3 is disposed on (fixed to) the bottom surface of the recess 211 of the base 21 through the second stress buffer layer 62. The electrical connection between the second stress buffer layer 62 and the IC 5 can be made with, for example, a bonding wire (not shown), a wiring formed in the base 21, or the like.

With the arrangement described above, the propagation distance of the vibration, caused by the driving of the angular rate sensor element 4, to the acceleration sensor element 3 can be lengthened, and the vibration is still less likely to be transmitted to the acceleration sensor element 3. Moreover, by disposing the acceleration sensor element 3 having a thickness larger than the angular rate sensor element 4 on the base 21, the low profile of the physical quantity sensor 1 can also be achieved.

Also according to the third embodiment, an advantageous effect similar to that of the first embodiment described above can be provided.

In the embodiment, the second stress buffer layer 62 is disposed between the acceleration sensor element 3 and the base 21; however, the second stress buffer layer 62 may be omitted. That is, as shown in FIG. 13, the acceleration sensor element 3 may be fixed to the base 21. Alternatively, the first stress buffer layer 61 may be omitted. That is, the angular rate sensor element 4 may be fixed to the IC 5 through the fixing members 8. Also with these configurations, an advantageous effect similar to that of the embodiment can be provided.

Fourth Embodiment

Next, a physical quantity sensor according to a fourth embodiment of the invention will be described.

Figure 14:
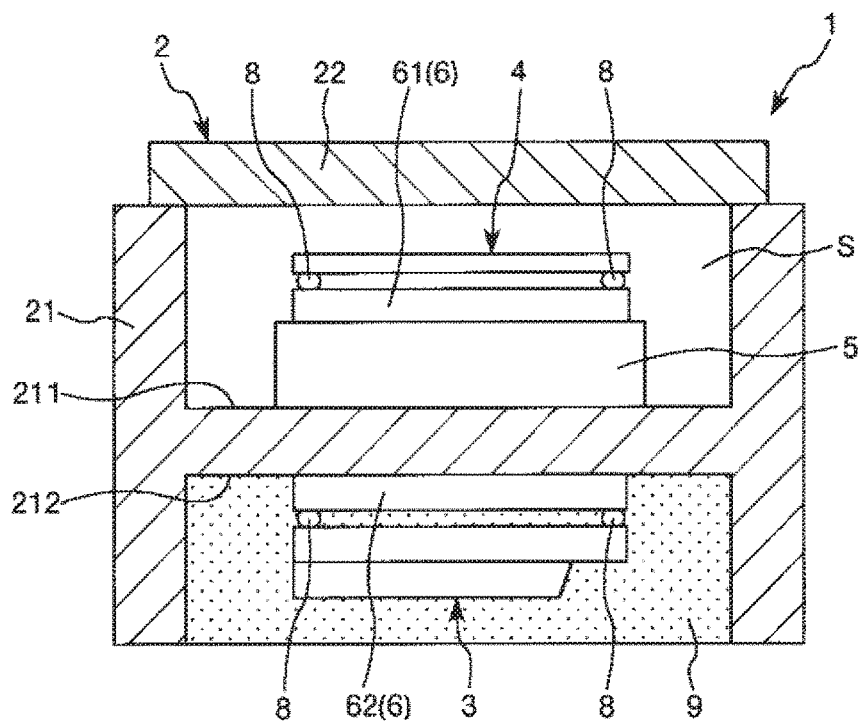
FIG. 14 is a cross-sectional view showing a physical quantity sensor according to a fourth embodiment of the invention.
Figure 15:
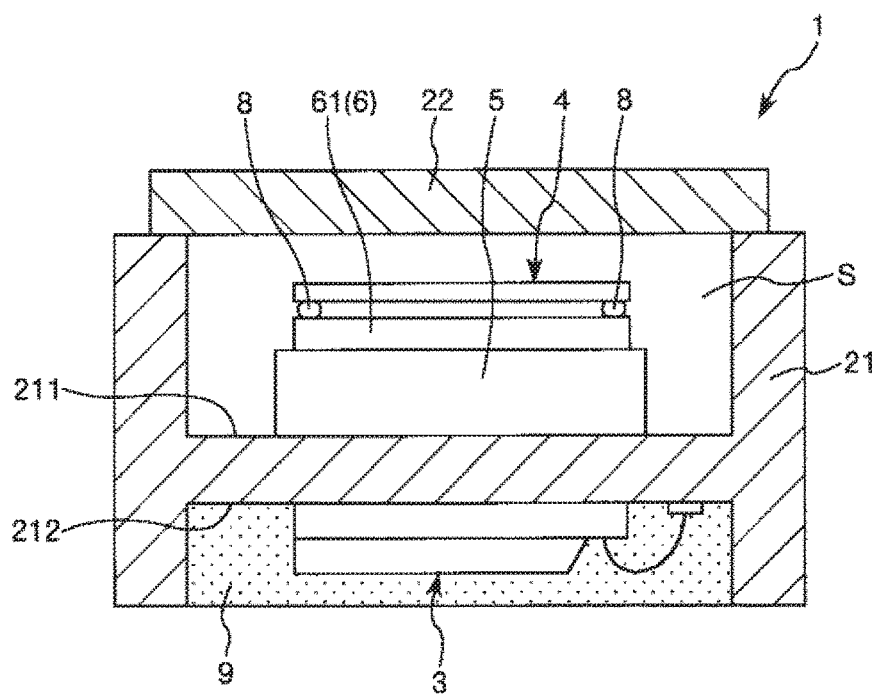
FIG. 15 is a cross-sectional view showing a modified example of the physical quantity sensor shown in FIG. 14.

FIG. 14 is a cross-sectional view showing the physical quantity sensor according to the fourth embodiment of the invention. FIG. 15 is a cross-sectional view showing a modified example of the physical quantity sensor shown in FIG. 14.

The physical quantity sensor according to the embodiment is similar to the physical quantity sensor according to the first embodiment described above, except that the shape of the package and the arrangement of the acceleration sensor element are different.

In the following description, the physical quantity sensor of the fourth embodiment is described focusing on the differences from that of the embodiment(s) described above, and the description of similar matters is omitted. In FIGS. 14 and 15, configurations similar to those of the embodiment described above are denoted by the same reference characters (numerals and signs), and are described above.

In the physical quantity sensor 1 of the embodiment as shown in FIG. 14, the base 21 includes the recess 211 opened in the upper surface, and a recess 212 opened in the lower surface. The opening of the recess 211 is closed by the lid 22 to form the interior space S. The interior space S is hermetically sealed, and a reduced-pressure state (approximately 10 PA or less; preferably a vacuum) is established therein. The IC 5 is disposed on the bottom surface of the recess 211, and the angular rate sensor element 4 is disposed on the upper surface of the IC 5 through the first stress buffer layer 61. On the other hand, the acceleration sensor element 3 is accommodated on the bottom surface of the recess 212 through the second stress buffer layer 62. Moreover, a molding material 9 for overmolding the acceleration sensor element 3 is filled in the recess 212.

With the arrangement described above, the propagation distance of the vibration, caused by the driving of the angular rate sensor element 4, to the acceleration sensor element 3 can be lengthened, and the vibration is still less likely to be transmitted to the acceleration sensor element 3. Moreover, since the acceleration sensor element 3, the angular rate sensor element 4, and the IC 5 can be disposed to overlap in the height direction, the widening of the physical quantity sensor in the in-plane direction can be suppressed, and thus the physical quantity sensor 1 can be miniaturized.

Also according to the fourth embodiment, an advantageous effect similar to that of the first embodiment described above can be provided.

In the embodiment, the second stress buffer layer 62 is disposed between the acceleration sensor element 3 and the base 21; however, the second stress buffer layer 62 may be omitted. That is, as shown in FIG. 15, the acceleration sensor element 3 may be fixed to the base 21. Alternatively, the first stress buffer layer 61 may be omitted. That is, the angular rate sensor element 4 may be fixed to the IC 5 through the fixing members 8. Also with these configurations, an advantageous effect similar to that of the embodiment can be provided.

Electronic Apparatus

Next, electronic apparatuses including the physical quantity sensor 1 will be described based on FIGS. 16 to 18.

Figure 16:
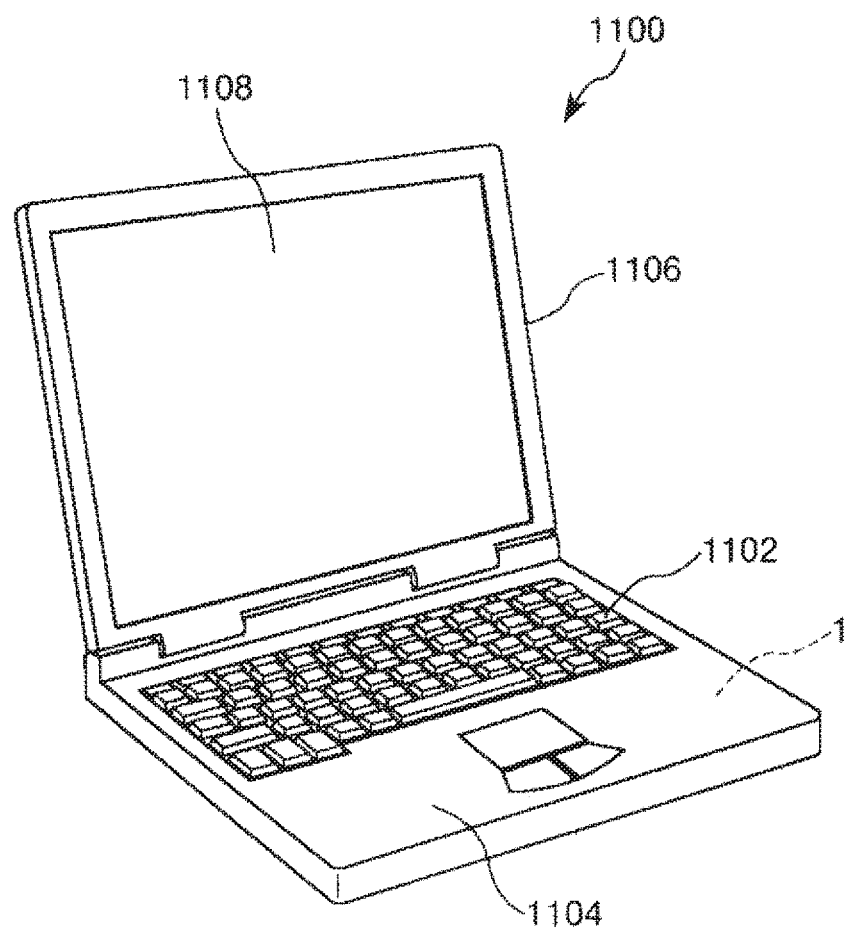
FIG. 16 is a perspective view showing a configuration of an exemplary mobile (or notebook) personal computer to which an electronic apparatus according to the invention is applied.

FIG. 16 is a perspective view showing the configuration of a mobile (or notebook) personal computer to which the electronic apparatus according to the invention is applied.

In the drawing, the personal computer 1100 is composed of a main body portion 1104 including a keyboard 1102, and a display unit 1106 including a display portion 1108. The display unit 1106 is rotatably supported relative to the main body portion 1104 through a hinge structure portion. The physical quantity sensor 1, which detects angular rate and acceleration, is incorporated into the personal computer 1100.

Figure 17:
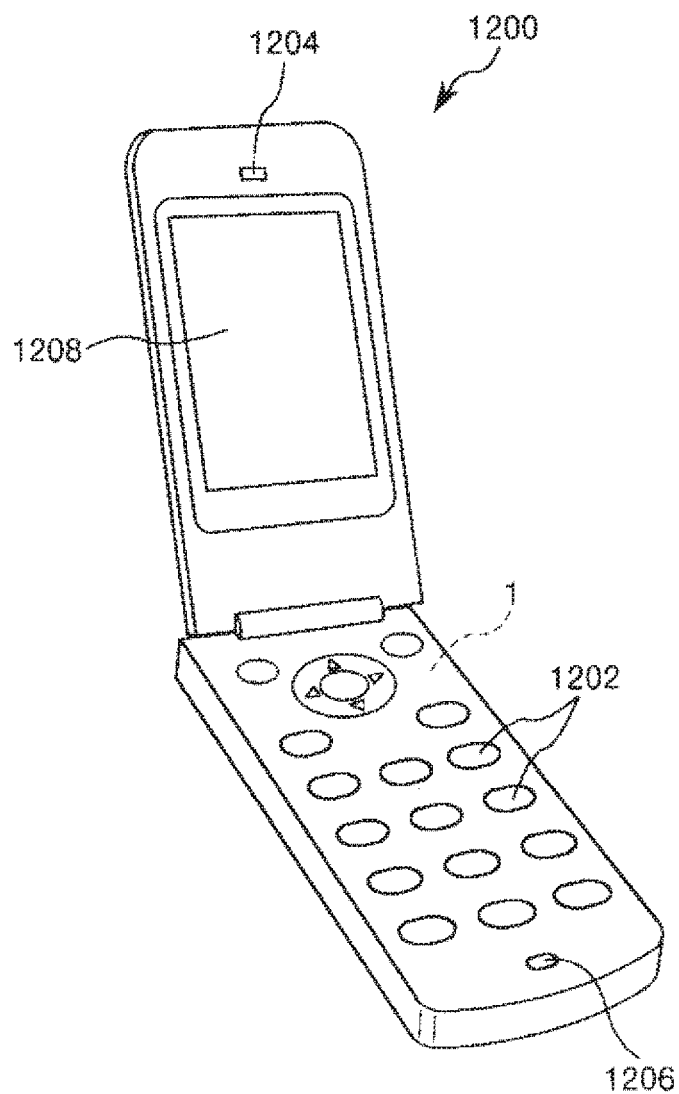
FIG. 17 is a perspective view showing a configuration of an exemplary mobile phone (including a smartphone a Personal Handy-phone System, PHS, or Personal Access System, PAS) to which the electronic apparatus according to the invention is applied.

FIG. 17 is a perspective view showing the configuration of a mobile phone (including a smartphone and a Personal Handy-phone System, PHS, or Personal Access System, PAS) to which the electronic apparatus according to the invention is applied.

In the drawing, the mobile phone 1200 includes a plurality of operating buttons 1202, an earpiece 1204, and a mouthpiece 1206. A display portion 1208 is disposed between the operating buttons 1202 and the earpiece 1204. The physical quantity sensor 1, which detects angular rate and acceleration, is incorporated into the mobile phone 1200.

Figure 18:
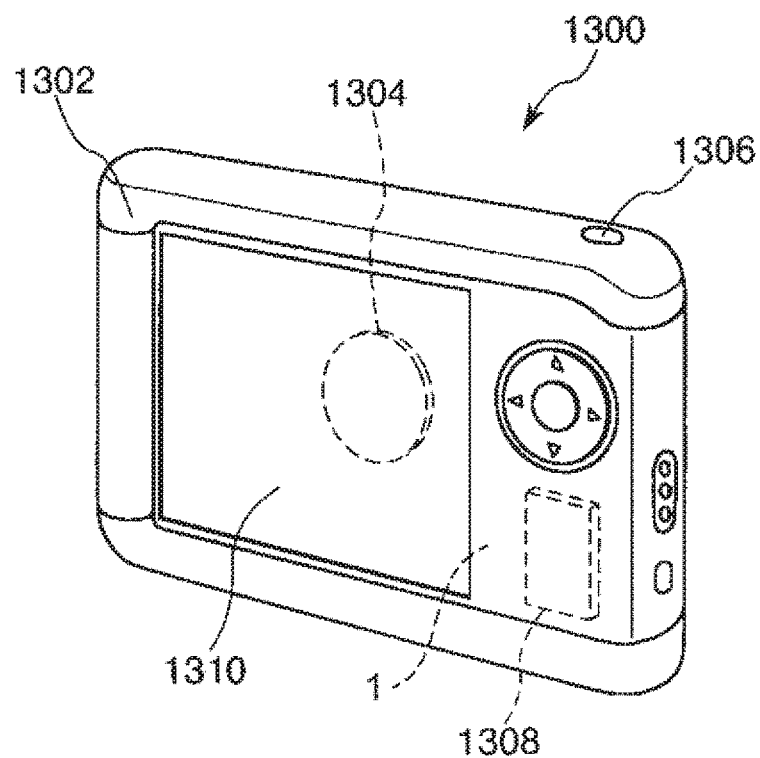
FIG. 18 is a perspective view showing a configuration of an exemplary digital still camera to which the electronic apparatus according to the invention is applied.

FIG. 18 is a perspective view showing the configuration of a digital still camera to which the electronic apparatus according to the invention is applied.

A display portion 1310 is provided on the back side of a case (body) 1302 in the digital still camera 1300, and configured to perform display based on imaging signals generated by a CCD. The display portion 1310 functions as a finder that displays a subject as an electronic image. Moreover, on the front side (the rear side in the drawing) of the case 1302, a light receiving unit 1304 including an optical lens (imaging optical system) and the CCD is provided. When a photographer confirms the subject image displayed on the display portion 1310 and presses down a shutter button 1306, imaging signals of the CCD at the time are transferred to and stored in a memory 1308. The physical quantity sensor 1, which detects angular rate and acceleration, is incorporated into the digital still camera 1300.

Since the electronic apparatuses described above include the physical quantity sensor 1, high reliability can be provided.

The electronic apparatus according to the invention can be applied to, in addition to the personal computer (mobile personal computer) in FIG. 16, the mobile phone in FIG. 17, and the digital still camera in FIG. 18, for example a smartphone, a tablet terminal, a watch (including a smartwatch), a wearable terminal such as a head-mounted display (HMD), an inkjet ejection device (e.g., an inkjet printer), a laptop personal computer, a television set, a video camcorder, a video tape recorder, a car navigation system, a pager, an electronic notebook (including one with communication function), an electronic dictionary, an calculator, an electronic game console, a word processor, a workstation, a videophone, a surveillance television monitor, electronic binoculars, a POS terminal, a medical device (e.g., an electronic thermometer, a sphygmomanometer, a blood glucose meter, an electrocardiogram measuring system, an ultrasonic diagnosis apparatus, and an electronic endoscope), a fishfinder, various types of measuring instrument, indicators (e.g., indicators used in a vehicle, aircraft, and a ship), and a flight simulator.

Moving Object

Next, a moving object including the physical quantity sensor 1 will be described based on FIG. 19.

Figure 19:
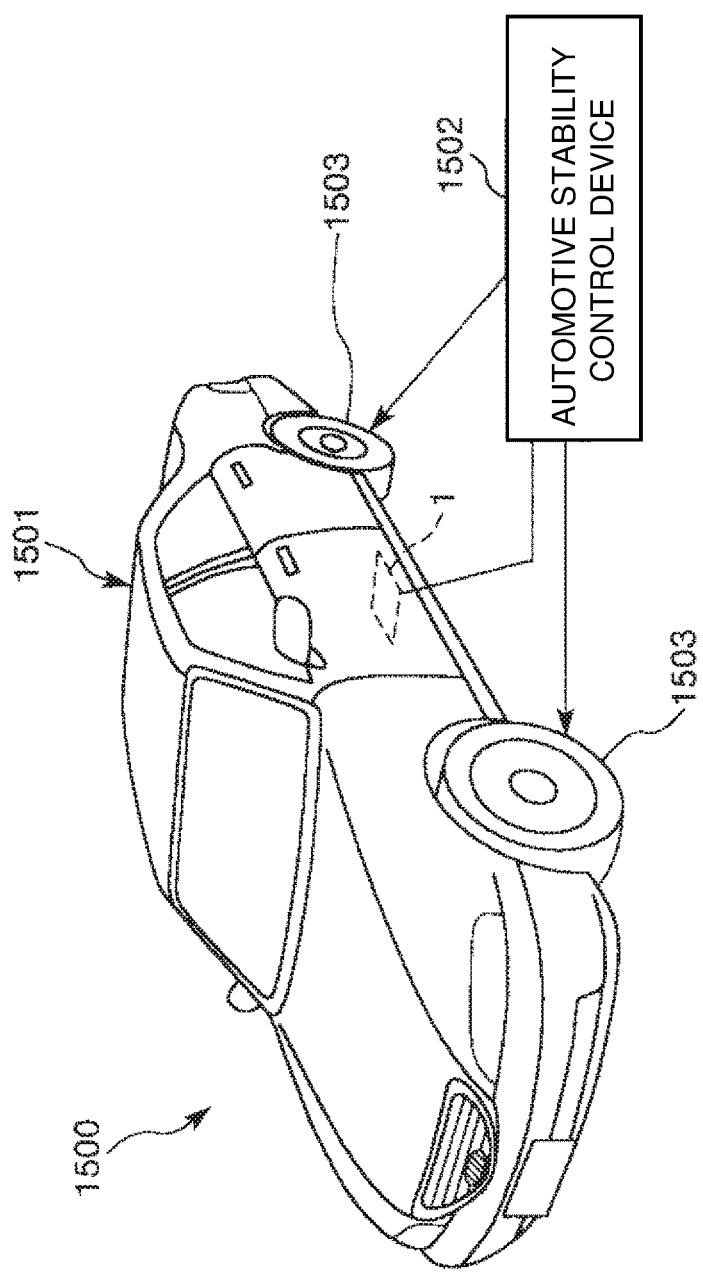
FIG. 19 is a perspective view showing the configuration of an exemplary automobile to which a moving object according to the invention is applied.

FIG. 19 is a perspective view showing the configuration of an automobile to which the moving object according to the invention is applied.

The physical quantity sensor 1, which detects angular rate and acceleration, is incorporated into the automobile 1500, and the attitude of a vehicle body 1501 can be detected by the physical quantity sensor 1. A detection signal of the physical quantity sensor 1 is supplied to a automotive stability control device 1502. The automotive stability control device 1502 can detect the attitude of the vehicle body 1501 based on the signal, control the hardness and softness of a suspension in response to a result of the detection, and control a brake of each wheel 1503. In addition, the attitude control can be used in a bipedal walking robot or a radio-controlled helicopter. As described above, the physical quantity sensor 1 is incorporated for realizing the attitude control of various types of moving objects.

The physical quantity sensor, the electronic apparatus, and the moving object according to the invention have been described based on the embodiments shown in the drawings. However, the invention is not limited to the embodiments, and the configuration of each part can be replaced with any configuration having a similar function. Moreover, any other component may be added to the invention. Moreover, the invention may include any two or more configurations (features) of the embodiments combined together.

In the embodiment described above, the acceleration sensor element is configured to detect the acceleration in the X-axis direction; however, the detection axis of the acceleration sensor element is not particularly limited and may lie in the Y-axis direction or the Z-axis direction. Moreover, the acceleration sensor element may be configured to detect acceleration in directions of at least two axes of the X-axis, the Y-axis, and the Z-axis. Similarly, in the embodiment described above, the angular rate sensor element is configured to detect the angular rate about the Z-axis; however, the detection axis of the angular rate sensor element is not particularly limited, and the angular rate sensor element may detect angular rate about the X-axis or the Y-axis. Moreover, the angular rate sensor element may be configured to detect angular rate about at least two axes of the X-axis, the Y-axis, and the Z-axis.

Lastly, Japanese Patent Application No. 2015-207520, filed Oct. 21, 2015, is expressly incorporated by reference herein in its entirety.

What is claimed is:

1. A physical quantity sensor comprising:
   a base;
   a circuit element disposed on the base;
   a first physical quantity sensor element disposed over the base or the circuit element, and driven to vibrate;
   a second physical quantity sensor element disposed over the base or the circuit element; and
   a stress buffer layer interposed between (i) the first physical quantity sensor element or the second physical quantity sensor element, and (ii) the base or the circuit element, the stress buffer layer including:
      a first insulating layer formed directly on an upper surface of the base or the circuit element;
      a first wiring layer formed directly on an upper surface of the first insulating layer;
      a second insulating layer, a part of the second insulating layer being formed directly on an upper surface of the first insulating layer, another part of the second insulating layer being formed directly on an upper surface of the first wiring layer; and
      a second wiring layer formed directly on an upper surface of the second insulating layer, the first physical quantity sensor element or the second physical quantity sensor element being disposed above the second wiring layer in a layer stacking direction, the first wiring layer and the second wiring layer electrically connecting the first physical quantity sensor element or the second physical quantity sensor element with a terminal disposed on the base or the circuit element, wherein:
   when the stress buffer layer is interposed between (i) the first physical quantity sensor element and (ii) the base or the circuit element, a ground potential is applied to the first wiring layer that is spaced farther apart from the first physical quantity sensor element than the second wiring layer; and
   when the stress buffer layer is interposed between (i) the second physical quantity sensor element and (ii) the base or the circuit element, a ground potential is applied to the second wiring layer that is closer to the second physical quantity sensor element than the first wiring layer.

2. The physical quantity sensor according to claim 1, wherein
   the first physical quantity sensor element is disposed on the stress buffer layer, and the stress buffer layer is disposed on the circuit element.

3. The physical quantity sensor according to claim 2, wherein
   the second physical quantity sensor element is not disposed over the stress buffer layer.

4. The physical quantity sensor according to claim 1, wherein:
   the stress buffer layer includes a first stress buffer layer component and a second stress buffer layer component disposed spaced apart from each other, both the first stress buffer layer component and second stress buffer layer component are disposed on the circuit element;
   the first physical quantity sensor element is disposed on the first stress buffer layer component over the circuit element; and
   the second physical quantity sensor element is disposed on the second stress buffer layer component over the circuit element.

5. The physical quantity sensor according to claim 1, wherein:
   the stress buffer layer is disposed on the circuit element;
   the first physical quantity sensor element is disposed on the stress buffer layer over the circuit element; and
   the second physical quantity sensor element is disposed over the base.

6. The physical quantity sensor according to claim 5, wherein:
   the stress buffer layer includes a first stress buffer layer component and a second stress buffer layer component disposed spaced apart from each other, the first stress buffer layer component being disposed on the circuit element and the second stress buffer layer component being disposed on the base;
   the first physical quantity sensor element is disposed on the first stress buffer layer component over the circuit element; and
   the second physical quantity sensor element is disposed on the second stress buffer layer component over the base.

7. The physical quantity sensor according to claim 2, wherein:
   the circuit element is disposed on a first surface of the base; and
   the second physical quantity sensor element is disposed on a second surface of the base on a side of the base opposite to a side defined by the first surface.

8. The physical quantity sensor according to claim 1, wherein the circuit element includes:
   a drive circuit that drives the first physical quantity sensor element;
   a first detection circuit that performs a detection process based on a detection signal from the first physical quantity sensor element; and
   a second detection circuit that performs a detection process based on a detection signal from the second physical quantity sensor element.

9. The physical quantity sensor according to claim 1, wherein:
   the first physical quantity sensor element is an angular rate sensor that detects angular rate; and
   the second physical quantity sensor element is an acceleration sensor that detects acceleration.

10. An electronic apparatus comprising the physical quantity sensor according to claim 1.

11. An electronic apparatus comprising the physical quantity sensor according to claim 2.

12. An electronic apparatus comprising the physical quantity sensor according to claim 3.

13. An electronic apparatus comprising the physical quantity sensor according to claim 4.

14. An electronic apparatus comprising the physical quantity sensor according to claim 5.

15. An electronic apparatus comprising the physical quantity sensor according to claim 6.

16. A moving object comprising the physical quantity sensor according to claim 1.

17. A moving object comprising the physical quantity sensor according to claim 2.

18. A moving object comprising the physical quantity sensor according to claim 3.

19. A moving object comprising the physical quantity sensor according to claim 4.

20. A moving object comprising the physical quantity sensor according to claim 5.

\* \* \* \* \*